US008389095B2

(12) United States Patent
Allred et al.

(10) Patent No.: US 8,389,095 B2
(45) Date of Patent: Mar. 5, 2013

(54) OPTICAL DATA STORAGE MEDIA CONTAINING SUBSTANTIALLY INERT LOW MELTING TEMPERATURE DATA LAYER

(75) Inventors: David E. Allred, Layton, UT (US); Erik C. Bard, Lehi, UT (US); Robert C. Davis, Provo, UT (US); Douglas P. Hansen, Spanish Fork, UT (US); Matthew R. Linford, Orem, UT (US); Barry M. Lunt, Provo, UT (US); Mark O. Worthington, Montrose, CA (US)

(73) Assignee: Brigham Young University, Provo, UT (US)

( * ) Notice: Subject to any disclaimer, the term of this patent is extended or adjusted under 35 U.S.C. 154(b) by 283 days.

(21) Appl. No.: 12/714,345

(22) Filed: Feb. 26, 2010

(65) Prior Publication Data

US 2010/0221481 A1    Sep. 2, 2010

Related U.S. Application Data

(60) Provisional application No. 61/208,728, filed on Feb. 27, 2009.

(51) Int. Cl.
*B32B 3/02* (2006.01)

(52) U.S. Cl. .................. 428/64.1; 428/64.4; 430/270.12
(58) Field of Classification Search .................. 428/64.4
See application file for complete search history.

(56) References Cited

U.S. PATENT DOCUMENTS

| 4,839,861 A * | 6/1989 | Ikegawa et al. ............... 365/113 |
| 2005/0223402 A1 | 10/2005 | Van Den Oetelaar et al. |
| 2008/0019261 A1 | 1/2008 | Nakai et al. |
| 2008/0080352 A1 * | 4/2008 | Kitaura et al. ............... 369/100 |
| 2008/0145587 A1 | 6/2008 | Yuzurihara et al. |
| 2010/0221481 A1 | 9/2010 | Allred et al. |

FOREIGN PATENT DOCUMENTS

WO    2010/099498 A2    9/2010

OTHER PUBLICATIONS

International Search Report, PCT/US2010/025676, dated Aug. 30, 2010.

\* cited by examiner

*Primary Examiner* — Elizabeth Mulvaney
(74) *Attorney, Agent, or Firm* — Workman Nydegger

(57) ABSTRACT

Optical information media that contain a data layer material that is substantially inert to oxidation and has a defined melting point range are disclosed. The inertness to oxidation and melting point range make the media particularly attractive for long-term information storage.

22 Claims, 6 Drawing Sheets

| Data layer | 15 |
| Intervening layer(s) | 20 |
| Support substrate | 10 |

| Data layer | 15 |
| Intervening layer(s) | 20 |
| Support substrate | 10 |

FIG. 2

| |
|---|
| Second dielectric layer 35 |
| Data layer 15 |
| First dielectric layer 30 |
| Support substrate 10 |

FIG. 4

| | |
|---|---|
| Second support substrate | 25 |
| Second dielectric layer | 35 |
| Data layer | 15 |
| First dielectric layer | 30 |
| First support substrate | 10 |

FIG. 5

| | |
|---|---|
| Second support substrate | 25 |
| Second intervening layer(s) | 40 |
| Data layer | 15 |
| First intervening layer(s) | 20 |
| First dielectric layer | 30 |
| First support substrate | 10 |

OPTICAL DATA STORAGE MEDIA CONTAINING SUBSTANTIALLY INERT LOW MELTING TEMPERATURE DATA LAYER

CROSS-REFERENCE TO RELATED APPLICATIONS

This application claims the benefit of U.S. Provisional Application No. 61/208,728 entitled "OPTICAL DATA STORAGE MEDIA CONTAINING SUBSTANTIALLY INERT LOW MELTING TEMPERATURE DATA LAYER" and filed on Feb. 27, 2009.

TECHNICAL FIELD

The invention relates to long-term digital data storage media, and more specifically, to materials and manufacturing processes that produce very stable digital data storage media. In particular, an optical disc having a data layer containing a substantially inert material with a melting temperature between about 200° C. and 1000° C. is disclosed.

BACKGROUND

Optical data storage media typically involves the use of organic dyes or phase change materials in the data layer. These materials are inexpensive, and can be easily "written" using low powered lasers. Unfortunately, these materials tend to degrade over time, making them unsuitable for long-term data storage.

Metals and metal alloys have also been used in data storage media. Tellurium was used in early materials, but was not widely accepted due to its susceptibility to oxidation. Tellurium alloys such as GST (GeSbTe), $AgSbSe_2$, and $AgSbTe_2$ have sufficiently improved oxidation resistance, making them more suitable for data storage.

Despite the range of materials used to date for optical data storage, they all exhibit varying degrees of oxidation. This oxidation makes them less attractive for long-term data storage. Accordingly, there exists a need for data storage media containing one or more materials that are substantially inert to oxidation.

SUMMARY

Optical information media containing an oxidation resistant data layer are particularly attractive for long-term data storage. The data layer contains at least one material that is both substantially inert to oxidation and has a melting point of about 200° C. to about 1000° C. in either bulk form, as a 50 nm thin film, and/or as a porous or a particulate film.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 2 shows an optical information medium having a support substrate, at least one intervening layer, and a substantially inert low melting temperature data layer.

FIG. 4 shows an optical information medium having a support substrate, a first dielectric layer, a substantially inert low melting temperature data layer, and a second dielectric layer.

FIG. 5 shows an optical information medium having a first support substrate, a first dielectric layer, a substantially inert low melting temperature data layer, a second dielectric layer, and a second support substrate.

FIG. 6 shows an optical information medium having a first support substrate, a first dielectric layer, at least one first intervening layer, a substantially inert low melting temperature data layer, at least one second intervening layer, and a second support substrate.

DETAILED DESCRIPTION

Figure 1:
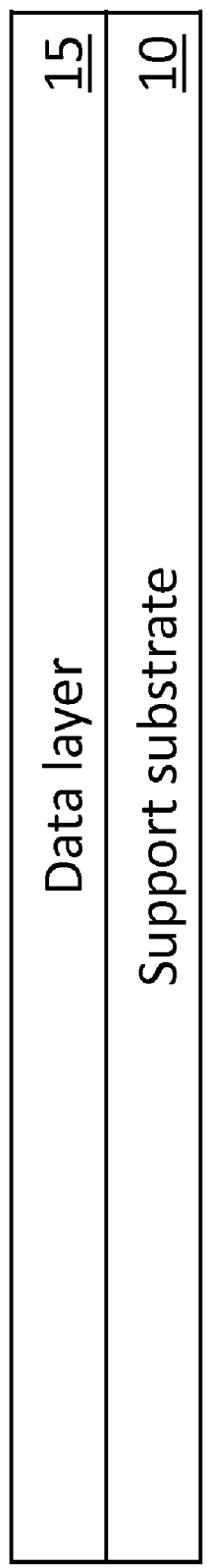
FIG. 1 shows an optical information medium having a support substrate in direct facial contact with a substantially inert low melting temperature data layer.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Materials

One embodiment comprises an optical information medium suitable for archival purposes. The materials and manufacturing processes are designed to be very durable and not subject to age-degradation effects to a substantial degree. Likewise, the information writing process is intended to be permanent and not subject to age degradation effects to a substantial degree. The optical information medium comprises at least one data layer, and at least one support substrate, where the data layer comprises at least one data layer material that is substantially inert to oxidation and has a melting point of about 200° C. to about 1000° C. in either bulk form, as a 50 nm thin film, and/or as a porous or a particulate film. This defined melting point range is attractive, as these temperatures can be readily achieved using a laser source.

The data layer preferably provides a high optical contrast between written and unwritten portions. For example, the unwritten data layer could have either a high optical reflectivity or a low optical reflectivity. Materials having small bandgaps of less than or equal to about 1.5 eV can be attractive due to their high optical contrast.

The optical information medium can generally be any shape and size. A currently preferred shape is a flat, round disc. Other shapes include a drum or a linear tape. Currently envisioned media include flat, round shapes in sizes including about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter.

A cross-section view of the optical information medium can be symmetrical or asymmetrical. The cross-section is most commonly asymmetrical.

The data layer comprises, consists essentially of, or consists of at least one data layer material that is substantially inert to oxidation, and has a melting point or decomposition point of about 200° C. to about 1000° C. when either in (a) bulk form, (b) as a 50 nm thin film, and/or (c) as a porous or a particulate film. The phrase "substantially inert to oxidation" means that after exposure of the bulk material to air at 22° C. for 48 hours, either (a) an oxide layer does not form on the bulk material, or (b) an oxide layer forms on the bulk material that is no more than about 30 nm thick. It is more preferable that the oxide layer is no more than about 25 nm thick, no more than about 20 nm thick, no more than about 15 nm thick, no more than about 10 nm thick, no more than about 8 nm thick, no more than about 6 nm thick, no more than about 5 nm thick, no more than about 4 nm thick, no more than about 3 nm thick, no more than about 2 nm thick, no more than about 1 nm thick, or that an oxide layer does not form on the bulk material. The thickness of an oxide layer can be readily measured using X-ray Photoelectron Spectroscopy (XPS) or Scanning Electron Microscope (SEM) techniques. In an alternative definition, "substantially inert to oxidation at high temperature" can be measured similarly by exposure of the bulk material to air at 200° C. for 48 hours and measuring the thickness of any formed oxide layer. Stable oxide materials are both inert to oxidation and inert to oxidation at high temperature, as they are already fully oxidized.

The data layer material can generally be a metal, a metal alloy, a metal oxide, a metalloid, or any combination of these material types. Specific examples of the data layer material include AuSn alloys (bulk melting point between 278° C. and 1064° C., depending on the percentage Sn content), AuSi alloys (bulk melting point between 363° C. and 1064° C., depending on the percentage Si content), AuGe alloys (bulk melting point between 300° C. and 1064° C., depending on the percentage Ge content), AuIn alloys (485° C. bulk melting point), CrO (197° C. bulk melting point), $CrO_2$ (400° C. bulk decomposition point), and $VO_2$ (1967° C. bulk melting point; 400° C. thin film melting point).

The data layer can further comprise at least one dopant. The dopant can be used to modulate or modify the thermal, optical, and stability profile of the data layer material. Alternatively or additionally, the dopant can be used to modify the asymmetry of the readout signal when reading the marks.

The data layer can generally be any thickness. A lower thickness limit can be about 2 nm. An upper thickness limit can be about 250 nm. Exemplary thicknesses are about 2 nm, about 4 nm, about 6 nm, about 8 nm, about 10 nm, about 12 nm, about 14 nm, about 16 nm, about 18 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, and ranges between any two of these values. One specific range can be about 12 nm to about 45 nm.

The data layer can further comprise sites to which data has been written. The sites exhibit a detectable difference from other sites to which data has not been written.

The support substrate can generally be any material compatible with use in optical information storage. Polymers or ceramic materials having desirable optical and mechanical properties are widely available. Support substrates typically comprise polycarbonate, polystyrene, aluminum oxide, polydimethyl siloxane, polymethylmethacrylate, silicon oxide, glass, aluminum, stainless steel, or mixtures thereof. If substrate transparency is not desired, then metal substrates may be used. Other optically transparent plastics or polymers may also be used. Support substrates can be selected from materials having sufficient rigidity or stiffness. Stiffness is commonly measured as Young's modulus in units of pressure per unit area, and preferably is about 0.5 GPa to about 70 GPa. Specific examples of stiffness values are about 0.5 GPa, about 1 GPa, about 5 GPa, about 10 GPa, about 20 GPa, about 30 GPa, about 40 GPa, about 50 GPa, about 60 GPa, about 70 GPa, and ranges between any two of these values. Support substrates can be selected from materials having an index of refraction of about 1.45 to about 1.70. Specific examples of an index of refraction include about 1.45, about 1.5, about 1.55, about 1.6, about 1.65, about 1.7, and ranges between any two of these values.

The support substrate preferably comprises materials that are not subject to age degradation effects. Presently preferred materials are polycarbonate, glass, and silicon oxide (fused silica).

The support substrate can generally be any thickness. The substrate thickness can be selected as a function of the drive capacity: 1.2 millimeter-thick substrates are compatible with CD drives, 0.6 millimeter-thick substrates are compatible with DVD drives, and 0.1 millimeter-thick substrates are compatible with BD drives.

The optical information medium can comprise a first support substrate and a second support substrate. The first support substrate and second support substrate can be made of the same material, or can be made of different materials. The first support substrate and the second support substrate typically are oriented such that they form the outer two layers of the optical information medium (i.e. are the first and last layers when viewed as a cross section). This is especially true in a DVD-type format. This arrangement is shown in FIGS. 3, 5, and 6.

The support substrate can facially contact the data layer, or there can be at least one intervening layer between them. These arrangements of layers are graphically shown in FIGS. 1-2. In the embodiment shown in FIG. 1, a cross section would first intersect a first support substrate 10, then the data layer 15. In the embodiment shown in FIG. 2, a cross section would first intersect the first support substrate 10, then at least one intervening layer 20, then the data layer 15. In FIG. 2, the first support substrate 10 facially contacts the at least one intervening layer 20, and the at least one intervening layer 20 facially contacts the data layer 15.

Figure 3:
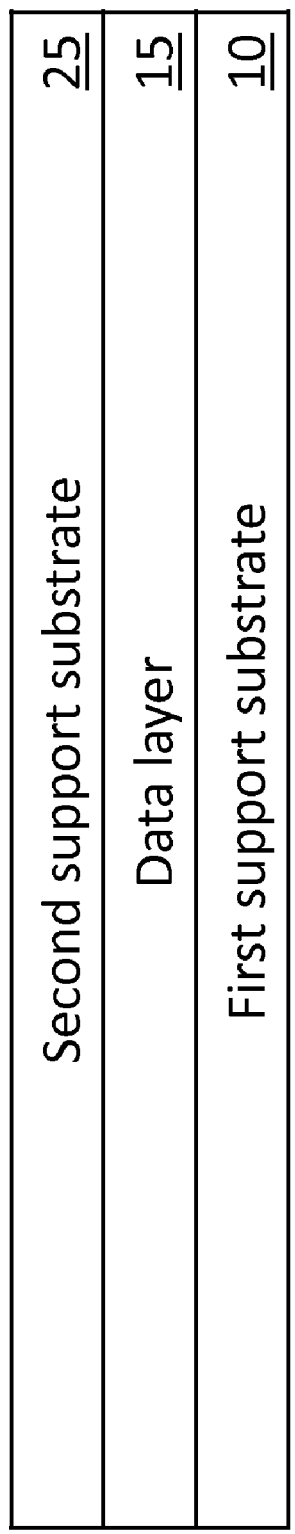
FIG. 3 shows an optical information medium having a first support substrate, a substantially inert low melting temperature data layer, and a second support substrate.

In the embodiment shown in FIG. 3, a cross section would first intersect the first support substrate 10, then the data layer 15, then a second substrate 25. In the embodiment of FIG. 4, a cross section would first intersect the first support substrate 10, then a first dielectric layer 30, then the data layer 15, then the second substrate 25. In the embodiment of FIG. 5, a cross section would first intersect the first support substrate 10, then the first dielectric layer 30, then the data layer 15, then a second dielectric layer, then the second substrate 25. In the embodiment of FIG. 6, a cross section would first intersect the first support substrate 10, then the first dielectric layer 30, then at least one first intervening layer 20, then the data layer 15, then at least one second intervening layer 40, then the second substrate 25.

Exemplary intervening layers include thermal barrier layers, dielectric layers, coupling layers, reflective layers, absorptive layers, destructive interference layers, constructive interference layers, material take-up layers, and adhesion promotion layers. Thermal barrier layers and dielectric layers can protect the substrate from heat generated during writing data to the data layer. Examples of thermal barrier layers and dielectric layers include silica ($SiO_2$), silicon dioxide-zinc sulfide ($SiO_2$—ZnS), zinc sulfide, carbon, alumina, silicon, silicon nitride, boron nitride, titanium oxides ($TiO_x$), and tantalum oxides ($TaO_x$). Coupling layers can provide a degree of absorption on a surface of an otherwise highly reflective layer. One example of a coupling layer is carbon. Reflective layers can provide increased reflectivity in front of or behind a data layer. Examples of reflective layer materials include chromium and silver. Absorptive layers may be used as coupling layers or to absorb radiation at any location within an optical medium stack. Destructive interference layers and constructive interference layers may include any material having an appropriate thickness and appropriate optical properties. The thickness may be optimized for a particular wavelength of light to cause either constructive interference or destructive interference for the particular laser radiation to be used. These interference layers may be used to increase the contrast between written and unwritten regions.

Exemplary materials that may be used for an interference layer include silicon nitride ($Si_3N_4$), magnesium fluoride ($MgF_2$), calcium fluoride ($CaF_2$), zinc sulfide (ZnS), fused quartz, cerium fluoride ($CeF_x$), lanthanum fluoride ($LaF_x$), neodymium fluoride ($NdF_x$), hafnium oxide ($HfO_x$), and other oxides. Exemplary metal oxides that may be used include chromium oxide ($Cr_xO_x$), molybdenum oxide ($MoO_x$), tungsten oxide ($WO_x$, $W_2O_3$), lead oxide ($Pb_xO_x$), tantalum oxide ($Ta_xO_x$), rhodium oxide ($Rh_xO_x$), cadmium oxide ($CdO_x$), indium oxide ($In_xO_x$), iron oxide ($Fe_xO_x$), titanium oxide ($Ti_xO_x$), aluminum oxide ($Al_2O_3$), yttrium oxide ($Y_2O_3$), lanthanum oxide ($La_2O_3$), zirconium oxide ($ZrO_2$), cerium oxide ($Ce_xO_x$), and magnesium oxide ($MgO_x$). The "x" subscript in the symbolic representations can be any integer, and the named materials are not to be limited by any of the symbolic representations. The metal oxide layer may contain one metal oxide, or mixtures of a plurality of metal oxides. Furthermore, any of a variety of polymers may be used. Such polymers may be spun on or applied in any other manner.

Material take-up layers function to receive at least a portion of a data layer material that is moved out of the data layer at least in part due to writing. The take-up mechanism may include an energetic projectile process, a diffusive process, or any other process in which material moves from the data layer into the take-up layer. Exemplary take-up layer materials include polycarbonate, chromium, and silicon. Adhesion promotion layers improve adhesion of at least one layer that is adjacent to the adhesion promotion layer. The adhesion promotion layer may improve the physical strength against delamination by adhering well to each layer that is adjacent to the adhesion promotion layer. Examples of adhesion promotion layers include chromium, carbon, and $SiO_2$. The particular adhesion promotion layer material to be used depends on the adjacent layers. For example, zirconium oxide ($ZrO_2$) and beryllium oxide (BeO) are good adhesion promotion layer materials for adhering to gold. It is to be understood that one material may provide more than one function, multiple materials may be used to provide a single function, or any combination of materials and layers may be used to provide any combination of functions without limitation.

An additional example of an intervening layer is a heat conduction layer. This type of layer conducts heat away from the sites to which data has been written, reducing or eliminating thermal damage to adjacent sites. An exemplary material for use in a conduction layer is chromium.

The optical information medium can include at least one reflective layer among the intervening layer(s) and/or in addition to the intervening layer(s). Reflective layers are typically oriented away from the support substrate, such that the distance from the reflective layer to the data layer is less than the distance from the reflective layer to the support substrate.

In one example, the data layer 15 includes AuSi, which becomes more reflective at the written marks than in the unwritten regions of the data layer upon writing to the data layer. In another example, the data layer includes black gold. Black gold is gold that is deposited such as by sputtering or evaporated at high pressures. Applying the gold at high pressures causes the gold to be applied as very small particles and/or to be highly porous. Other metals deposited at high pressure may also result in porous films or films comprised of very small particles. In any case, the small particle/highly porous data layer is more absorptive to laser radiation in the unwritten regions than in written regions at the marks. Thus, writing to a small particle/highly porous data layer such as black gold causes the data layer to become more reflective at the written marks and provides the needed contrast for subsequent reading of data.

In another embodiment, one or more intervening layers 20/40 are deposited between the first support substrate and the data layer. The one or more intervening layers 20 may include a coupling layer of carbon and/or chromium. Alternatively or additionally, the intervening layers 20/40 may include black gold or some other relatively absorptive material. In some embodiments, the intervening layers 20/40 may be a take-up layer and may include chromium or silicon that receives and/or intermixes with at least a portion of a material from the data layer 15.

In still another embodiment, the one or more intervening layers 20/40 may include one or more materials that function in either as a dielectric layer or as a protective layer of any type. Good candidates for such protective intervening layers may include zirconium oxide ($ZrO_2$) and/or beryllium oxide (BeO), which may also provide improved adhesion for some materials such as gold.

In still another embodiment, the one or more intervening layers 20/40 may include one or more of silicon nitride ($Si_3N_4$), hafnium oxide ($HfO_x$) and other oxides and/or other materials listed above with regard to materials that may be used for the interference layer. In some embodiments, it is preferable to use material(s) that have a relatively high index of refraction. The thickness of such an intervening layer 20 may be selected based on the reading laser wavelength such that the intervening layer 20 provides constructive interference or destructive interference of the reflected radiation from its two surfaces in accordance with Equations 1 and 2 below, where n is the index of refraction of the thin film, t is the thickness of the film, λ is the wavelength, and m is an integer (0, 1, 2 . . . ).

$$2nt=(m+½)\lambda \quad \text{Eq. 1}$$

$$2nt=m\lambda \quad \text{Eq. 2}$$

These equations are simplifications of more complex and more generally applicable equations that are publicly available. Nevertheless, these equations are at least conceptually accurate for the purposes of this disclosure.

These equations are applicable in a first case for a thin film of the intervening layer 20 that is sandwiched by material on both opposite faces of the intervening layer that either has an index of refraction greater than or an index of refraction that is less than that of the intervening layer. That is, n(first material), n(second material)<n(intervening layer) or n(first material), n(second material)>n(intervening layer). In the example of FIG. 6, this means that the first dielectric layer 30 and the data layer 15 would each have a higher index of refraction than the intervening layer 20 or they would each have a lower index of refraction than the intervening layer. In this case, Equation 1 may be used to determine the appropriate thickness of the intervening layer to provide constructive interference. Similarly, in this case, Equation 2 may be used to determine the appropriate thickness of the intervening layer to provide destructive interference. It is to be noted that n is generally a function of wavelength.

These equations are applicable for a second case in which a thin film of the intervening layer 20 is sandwiched by material on both opposite faces of the intervening layer, one of which has an index of refraction greater than the index of refraction of the intervening layer and the other of which has an index of refraction that is less than that of the intervening layer. That is, n(first material)<n(intervening layer)<n(second material) or n(first material)>n(intervening layer)>n(second material). In the example of FIG. 6, this means that the first dielectric layer 30 has an index of refraction that is lower than the index of refraction of the intervening layer 20, and the intervening layer 20 has a lower index of refraction than the data layer 15; or that the first dielectric layer 30 has an index of refraction that is greater than the index of refraction of the intervening layer 20 and the intervening layer 20 has a higher index of refraction than the data layer 15. In this second case, Equation 1 can be used to determine the appropriate thickness of the intervening layer to provide destructive interference. Similarly, in this case, Equation 2 may be used to determine the appropriate thickness of the intervening layer to provide constructive interference.

Materials having any index of refraction may be used. However, as the index becomes low, the thickness of the layer must increase to provide the desired interference. Conversely, an advantage for using materials having a relatively high index of refraction is that doing so enables incorporation of a thin interference layer. Depositing thinner interference layers results in faster manufacturing speeds than are possible for depositing thicker layers. Also, thinner layers may provide improved writing characteristics in the media. For example, disrupting thinner layers generally require less energy than disrupting thicker layers. Additionally or alternatively, thinner interference layers generally absorb less energy from the laser and surrounding layers. Hence, effective writing can still be achieved while writing with less energy. Furthermore, where heat management is an issue, it is to be understood that a writing process requiring less energy may be better for the media and the write quality itself. Still further, a lower energy writing process requires lower laser power and less costly drivers.

For data layer materials that become less reflective at the written marks, this constructive interference provides greater contrast between the more reflective unwritten regions and the less reflective written regions. The contrast may be even greater if writing the mark interrupts the constructive interference layer at the mark. For data layer materials that by themselves become more reflective at written marks, the intervening layer thickness may be selected to provide destructive interference such that reflectivity of the stack is generally decreased in the unwritten regions and the written regions. That is, if the destructive interference layer remains uninterrupted by writing the marks, then the reflectivity at the written marks may also be reduced by the destructive interference. On the other hand, if writing interrupts the destructive interference layer, then the contrast between unwritten regions and written regions will be greater than it would be without the destructive interference layer because the destructive interference effect would be maintained at the unwritten regions and would be reduced or eliminated at the marks due to writing.

It is to be understood that the constituent materials in the data layer 15 may have any ratio. For example, in a AuSi alloy data layer material, there may be any percentage of gold and any percentage of silicon. Similarly, there may be any level of doping. These percentages and levels of doping may be adjusted to control optical properties and the behavior of the media. Alternatively or additionally, the percentages and levels of doping can be used to modify the asymmetry of the readout signal when reading the written marks.

Methods of Preparation

Additional embodiments of the invention are directed towards methods of preparing an optical information medium.

The various layers can be applied in various orders, depending on the particular layering desired in the optical information medium product. The layers can all be applied on one side of the support substrate, resulting in a final product having the support substrate on one outer face. Alternatively, the layers can be applied onto both sides of the support substrate, resulting in a final product having the support substrate located such that it is not an outer face of the final product.

In the various methods described below, the data layer may comprise, consist essentially of, or consist of at least one data layer material that is substantially inert to oxidation and/or substantially inert to oxidation at high temperature. The data layer material may have a melting point or decomposition point of about 200° C. to about 1000° C. when either in (a) bulk form, (b) as a 50 nm thin film, and/or (c) as a porous or a particulate film.

In one embodiment, the method can comprise providing a support substrate, and applying a data layer such that the data layer facially contacts the support substrate. This method produces an optical information medium such as the one shown in FIG. 1.

In an alternative embodiment, the method can comprise providing a support substrate, applying at least one intervening layer such that the intervening layer facially contacts the support substrate, and applying a data layer such that the data layer facially contacts the intervening layer. This method produces an optical information medium such as the one shown in FIG. 2.

In yet another alternative embodiment, the method can comprise providing a first support substrate; applying a data layer, such that the data layer facially contacts the first support substrate; and applying a second support substrate, such that the second support substrate facially contacts the data layer. This method produces an optical information medium such as the one shown in FIG. 3.

In an additional alternative embodiment, the method can comprise providing a support substrate, applying at least one first dielectric layer such that the first dielectric layer facially contacts the support substrate, applying a data layer such that the data layer facially contacts the first dielectric layer, and applying at least one second dielectric layer such that the second dielectric layer facially contacts the data layer. This method produces an optical information medium such as the one shown in FIG. 4.

In an additional alternative embodiment, the method can comprise providing a first support substrate, applying at least one first dielectric layer such that the first dielectric layer facially contacts the support substrate, applying a data layer such that the data layer facially contacts the first dielectric layer, applying at least one second dielectric layer such that the second dielectric layer facially contacts the data layer, and applying a second support substrate such that the second support substrate facially contacts the second dielectric layer. This method produces an optical information medium such as the one shown in FIG. 5.

In an additional alternative embodiment, the method can comprise providing a first support substrate, applying at least one first dielectric layer such that the first dielectric layer facially contacts the support substrate, applying one or more first intervening layers such that the first intervening layer(s) facially contact the first dielectric layer, applying a data layer such that the data layer facially contacts the first intervening layer(s), applying one or more second intervening layer(s) such that the second intervening layers facially contact the data layer, and applying a second support substrate such that the second support substrate facially contacts the second intervening layer. This method produces an optical information medium such as the one shown in FIG. 6.

In one embodiment, preparing an optical information medium may include depositing a data layer material that becomes more reflective by the application of writing laser energy to the data layer. One example of a data layer material that responds in this way is AuSi. Thus, in one case, the method of preparation includes applying AuSi to the support substrate, a dielectric layer, or some other intervening layer. Another material that would behave to provide increased reflectivity after being written as compared to the material before writing is black gold. Black gold is gold that is deposited such as by sputtering or evaporation at high pressures. Applying the gold at high pressures causes the gold to be applied as very small particles and/or to be highly porous. Other materials may be similarly affected by application at high pressures. In any case, the small particle/highly porous data layer is more absorptive to laser radiation in the unwritten regions than in written regions at the marks. Thus, the method of preparation may include depositing data layer material of gold or some other material in a manner that creates greater absorption of laser energy in unwritten regions.

It is to be understood that the constituent materials in the data layer 15 may be adjusted. For example, in a AuSi alloy, any percentage of gold and any percentage of silicon may be incorporated. Similarly, any level of doping may be undertaken. These variations may be undertaken to adjust optical properties and the behavior of the media.

The applying steps can comprise physical vapor deposition (such as sputtering, reactive sputtering, e-beam evaporation, and laser ablation of a target), chemical vapor deposition, or spinning or printing the layer from nanoparticles of a material. The second support substrate can be applied with or without an adhesive.

Methods of Use

Any of the above described digital data mediums can be used to store digital data. Methods can comprise providing a optical information medium comprising: at least one support substrate, and at least one data layer, and applying energy to sites in the data layer to cause a detectable change in the data layer. The method can further comprise detecting the change in the data layer.

In one embodiment, causing a detectable change in the data layer includes causing the data layer to become more reflective by the application of energy to the data layer. One example of a data layer material that responds in this way is AuSi. Thus, in one case, the method includes causing AuSi to become more reflective at the written marks than in the unwritten regions of the data layer.

In another embodiment, causing a detectable change in the data layer includes causing the data layer to become more reflective by the application of energy to the data layer. One example of a data layer material that responds in this way is black gold. Black gold is gold that is deposited such as by sputtering or evaporation at high pressures. Applying the gold at high pressures causes the gold to be applied as very small particles and/or to be highly porous. Other materials may be similarly affected by application at high pressures. In any case the small particle/highly porous data layer is more absorptive to laser radiation in the unwritten regions than in written regions at the marks. That is, writing to a small particle/highly porous data layer such as black gold causes the data layer to become more reflective at the written marks.

In the various methods of use, the data layer comprises, consists essentially of, or consists of at least one data layer material that is substantially inert to oxidation and/or substantially inert to oxidation at high temperature, and has a melting point or decomposition point of about 200° C. to about 1000° C. when either in (a) bulk form, (b) as a 50 nm thin film, and/or (c) as a porous or a particulate film.

Applying energy to sites in the data layer can also locally generate sufficient heat to deform tracks in the support substrate, especially when the optical information medium does not contain a thermal barrier layer and/or heat conduction layer. Deformed sites in the support substrate can be subsequently detected.

Lasers can be used in the applying energy step and in the detecting step. Main classes of lasers include gas, diode-pumped solid state, and diode lasers.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Prophetic Example 1

Preparation of Polycarbonate Optical Disc with and AuSn Data Layer

A 12 cm diameter polycarbonate disc substrate would be provided. A substantially oxidation inert, low temperature melting point data layer of 15 nm thick AuSn would be applied to the disc substrate to form a structure as shown in FIG. 1.

Prophetic Example 2

Preparation of a Glass Optical Disc with a Chromium Intervening Layer and an AuSi Data Layer A 12 cm diameter glass disc substrate would be provided. An intervening layer of 5-10 nm chromium (Cr) would be applied to the disc substrate. A substantially oxidation inert, low temperature melting point data layer of 25 nm thick AuSi would be applied to the chromium layer to form a structure as shown in FIG. 2.

Prophetic Example 3

Preparation of Polycarbonate Optical Disc with a $CrO_2$ Data Layer

A 12 cm diameter polycarbonate disc substrate would be provided. A substantially oxidation inert, low temperature melting point data layer of 40 nm thick $CrO_2$ would be applied to the disc substrate. A polyurethane adhesive would be applied to the data layer, followed by a second polycarbonate disc substrate. The disc would be spun at 2,000-5,500 rpm for 2-5 seconds, and then UV cured to form a structure as shown in FIG. 3.

Prophetic Example 4

Preparation of Polycarbonate Optical Disc with an AuIn Alloy Data Layer

A 12 cm diameter polycarbonate disc substrate would be provided. A silicon dioxide dielectric layer would be applied to the disc substrate. Next, a substantially oxidation inert, low temperature melting point data layer of 30 nm thick AuIn would be applied to the first dielectric layer. A second, identical silicon dioxide upper dielectric layer would be applied to the data layer to form a structure as shown in FIG. 4.

This structure can further have a polyurethane adhesive applied to the second dielectric layer, followed by a second polycarbonate disc substrate. The disc would be spun at 2,000-5,500 rpm for 2-5 seconds, and then UV cured to form a structure as shown in FIG. 5.

Example 5

Preparation of Polycarbonate Optical Disc with a Dielectric Layer, Carbon Intervening Layers, and an AuSi Alloy Data Layer A polycarbonate support substrate was provided. A dielectric layer of $SiO_2$ was sputtered to a thickness of approximately 45 nm. A coupling/protective layer of carbon was sputtered to a thickness of approximately 19 nm atop the $SiO_2$ dielectric layer. A data layer of AuSi alloy was sputtered to a thickness of approximately 20 nm atop the carbon coupling/protective layer. Another protective layer of carbon was sputtered to a thickness of approximately 13 nm atop the AuSi data layer. The $SiO_2$, first carbon, AuSi, and second carbon layers were sputtered using a PVD 75 sputter deposition instrument (Kurt J. Lesker Company; Pittsburgh, Pa.).

Example 6

Writing to and Reading from the Polycarbonate Optical Disc of Example 5 Having the AuSi Data Layer Reflectivity was measured using an ODU1000 analytical instrument (Pulstec Industrial Co., Ltd.; Hamamatsu-City; Japan) with a diode laser set at a wavelength of 650 nm. The disc had an unwritten reflectivity, as seen by the ODU, of about 232 mV. Modulation was achieved by writing with the ODU at 1× at powers of 23 mW to 34 mW. The written areas on the disc became more reflective in comparison to the unwritten areas. Marks having sizes from 14T and 3T were written to the disc using a 1× multi-pulse write strategy. Modulation was achieved corresponding to a reflectivity variation of approximately 270 mV. These results indicate that this system of layers is a potentially functional system for writing and reading optical digital data.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

What is claimed is:

1. An optical information medium comprising:
   at least one support substrate;
   at least one data layer comprising at least one data layer material, wherein:
      the data layer material is substantially inert to oxidation; and
      the data layer material has a melting point of about 200° C. to about 1000° C. when either in (a) bulk form, (b) as a 50 nm thin film, and/or (c) as a porous or a particulate film; and
   a material take-up layer adjacent the data layer, the material take-up layer having a composition and configuration suitable to receive data layer material moved out of the data layer due to writing of the data layer.

2. The optical information medium of claim 1, wherein when the data layer material in bulk form is exposed to air at 22° C. for 48 hours, an oxide layer forms on the bulk material that is no more than 30 nm thick.

3. The optical information medium of claim 1, wherein when the data layer material in bulk form is exposed to air at 22° C. for 48 hours, an oxide layer does not form on the bulk material.

4. The optical information medium of claim 1, wherein when the data layer material is a stable oxide.

5. The optical information medium of claim 1, wherein the data layer comprises a AuSn alloy, a AuSi alloy, a AuGe alloy, a AuIn alloy, CrO, $CrO_2$, or $VO_2$.

6. The optical information medium of claim 1, wherein the data layer further comprises at least one dopant.

7. The optical information medium of claim 1, further comprising at least one intervening layer between the support substrate and the data layer.

8. The optical information medium of claim 1, wherein the support substrate comprises polycarbonate, polystyrene, aluminum oxide, polydimethyl siloxane, polymethylmethacrylate, silicon oxide, glass, fused silica, or mixtures thereof.

9. The optical information medium of claim 1, wherein the data layer has a thickness of about 2 nm to about 250 nm.

10. The optical information medium of claim 1, having a flat, round disc shape.

11. The optical information medium of claim 1, further comprising:
    at least one intervening layer between the support substrate and the data layer; wherein:
       the intervening layer comprises at least one of carbon and chromium; and
       the data layer comprises AuSi.

12. The optical information medium of claim 1, further comprising:
    at least one intervening layer between the support substrate and the data layer; wherein:
       the intervening layer comprises at least one of chromium and silicon; and
       the data layer comprises gold.

13. The optical information medium of claim 1, further comprising:
    at least one intervening laser between the support substrate and the data layer; wherein:
       the intervening layer comprises at least one of zirconium oxide and beryllium oxide; and
       the data layer comprises gold.

14. The optical information medium of claim 1, further comprising at least one intervening layer between the support substrate and the data layer, wherein the intervening layer comprises silicon nitride at a thickness that provides at least one of constructive interference and destructive interference of reflected laser radiation at a predetermined write laser wavelength.

15. The optical information medium of claim 1, wherein the data layer comprises at least one of AuSi and black gold.

16. A method of storing digital data, the method comprising:

providing an optical information medium comprising: at least one support substrate, and at least one data layer comprising at least one data layer material, wherein:

the data layer material is substantially inert to oxidation; and the data layer material has a melting point of about 200° C. to about 1000° C. when either in (a) bulk form, (b) as a 50 nm thin film, and/or (c) as a porous or a particulate film; and writing data to the data layer by applying energy to sites in the data layer to melt the data layer material so as to cause a detectable change in the data layer.

17. The method of claim 16, further comprising detecting the change in the data layer.

18. The method of claim 16, further comprising:

detecting the change in the data layer; and wherein an intervening layer causes at least one of constructive interference and destructive interference in reflected radiation from a reading laser.

19. The method of claim 16, wherein when the data layer material in bulk form when exposed to air at 22° C. for 48 hours forms an oxide layer on the bulk material that is no more than about 30 nm thick.

20. The method of claim 16, wherein when the data layer material is a stable oxide.

21. The method of claim 16, wherein the data layer comprises a AuSn alloy, a AuSi alloy, a AuGe alloy, a AuIn alloy, $CrO$, $CrO_2$, or $VO_2$.

22. The method of claim 16, wherein the data layer has a thickness of about 2nm to about 250 nm.

* * * * *